Aug. 1, 1939. C. SAUZEDDE 2,167,683
HYDROSTATIC BRAKE
Filed Nov. 18, 1936 4 Sheets-Sheet 1

Inventor
Claude Sauzedde
Attorneys

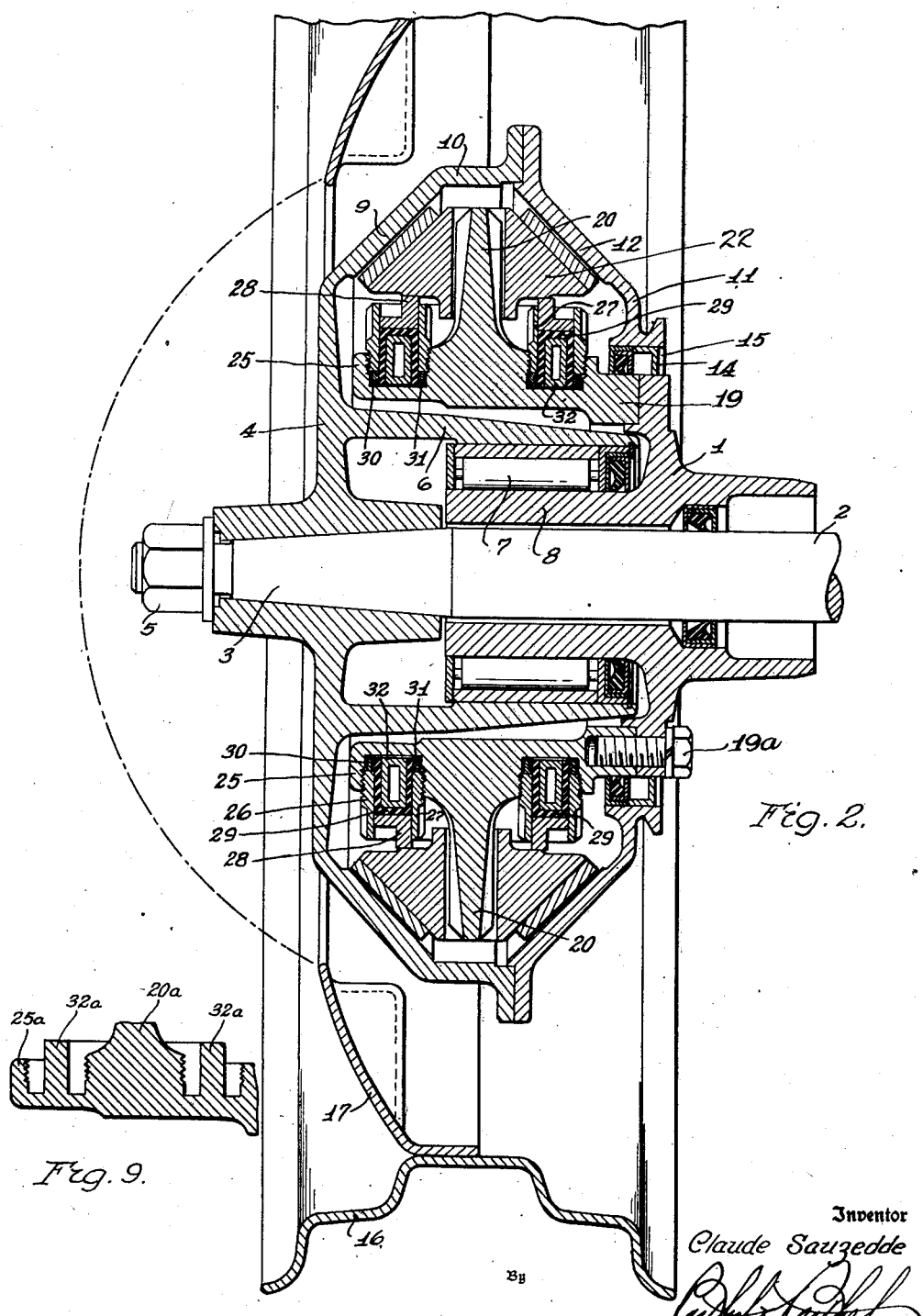

Aug. 1, 1939.  C. SAUZEDDE  2,167,683
HYDROSTATIC BRAKE
Filed Nov. 18, 1936  4 Sheets-Sheet 3

Inventor
Claude Sauzedde
By
Attorneys

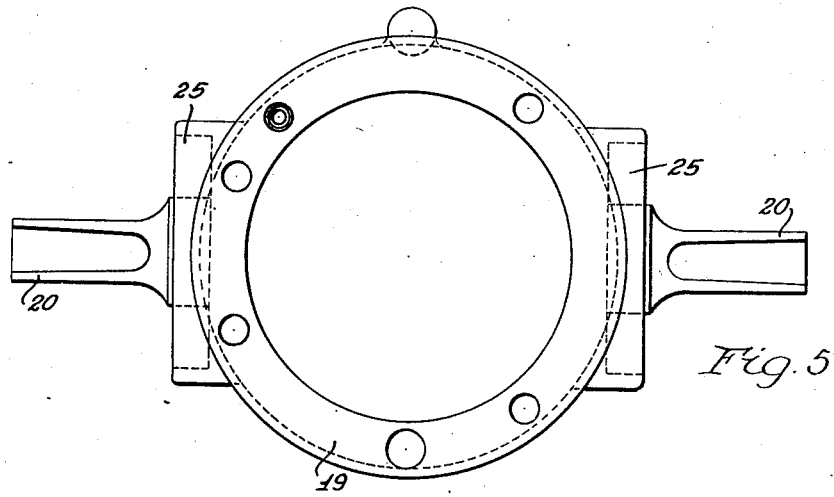
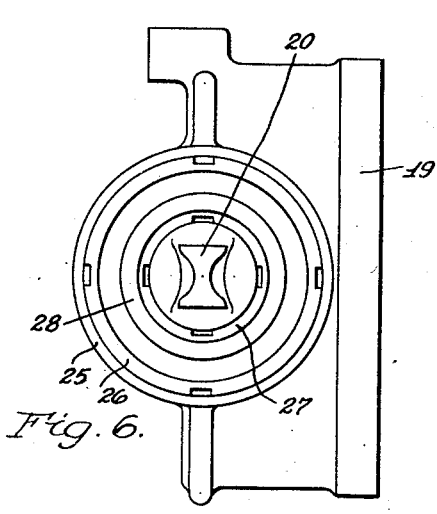
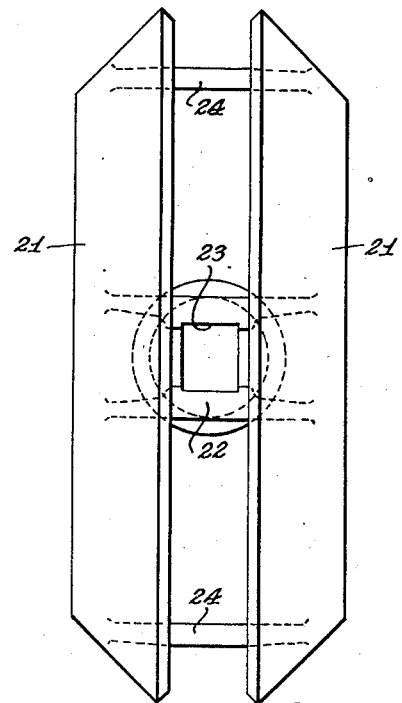
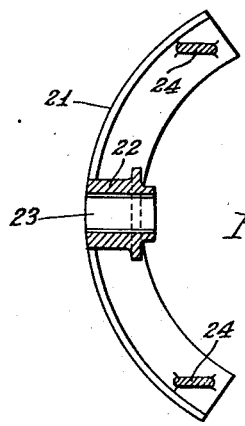

Patented Aug. 1, 1939

2,167,683

UNITED STATES PATENT OFFICE 2,167,683

HYDROSTATIC BRAKE

Claude Sauzedde, Detroit, Mich., assignor to Detroit Hydrostatic Brake Corporation, Detroit, Mich., a corporation of Michigan Application November 18, 1936, Serial No. 111,362

14 Claims. (Cl. 188—152)

This invention relates to a hydrostatic brake mechanism of a type particularly adapted for use on automotive vehicles and has special reference to the construction and arrangement of the fluid pressure units and the means for supporting the brake shoes with respect to the fluid pressure units whereby fluid under pressure may be utilized to cause engagement between the brake shoes and their brake drum.

The primary object of the present invention is to provide a hydrostatic brake embodying a plurality of segmental type brake shoes and means for supporting such brake shoes for movement radially into engagement with complemental braking surfaces carried by the wheel of a vehicle. The unit includes a stationary spider designed to be supported with respect to dirigible axle spindles or semi-floating, three-quarter floating or full floating drive axles. This spider includes a plurality of radially extending guide arms supporting the brake shoes for radial movement and an expansion chamber associated with each radial arm and having an element movable in response to fluid pressure for moving the shoes upon the arms. The expansion chambers and the movable elements are annular in form and surround the arms upon which the brake shoes are mounted and the fluid under pressure for actuating the same is conveyed by suitable means through the spider.

Another object of the present invention is to provide a hydrostatic brake unit of the character above referred to wherein a filler element is provided in each expansion chamber to reduce the fluid content therein. By reducing the amount of fluid contained in the expansion chambers such expansion chambers under ordinary conditions are completely emptied of fluid when the brake shoes are retracted and the amount of liquid which is subject to heat conditions resulting from severe and frequent brake applications is reduced to a minimum. A brake system embodying such units is not, therefore, materially effected by expansion and contraction of the actuating fluid therein.

Another object of the invention is to provide a hydrostatic brake unit wherein a plurality of double-faced, conical brake shoe units cooperate with a brake drum having complemental sections providing braking surfaces, the shoes being supported by stationary radial arms which permit the shoes to shift laterally to adapt themselves to the braking surfaces.

Another object of the present invention is to provide a hydrostatic brake unit of the character above referred to which is so constructed as to require no brake adjustments during the life thereof. In the present brake unit the expansion means which actuates the shoes is so constructed that it will provide the necessary movement for brake shoe engagement even though the brake lining has become worn. By this construction the brake unit may be actuated until the brake shoe lining material has been completely worn out without making any adjustments.

With the above and other ends in view the invention consists in matters hereinafter more particularly set forth with reference to the accompanying drawings in which Figure 1 is a vertical section in a plane transverse to the axis of the wheel and brake mechanism;

Fig. 2 is a horizontal section through the brake unit and wheel;

Fig. 5 is an end elevation of the spider;

Fig. 6 is a side elevation of the spider with the piston assembled therein;

Fig. 7 is an elevation of a brake shoe unit;

Fig. 8 is a vertical section thereof, and

Fig. 9 is a section of a modified detail.

Like characters of reference are employed throughout to designate corresponding parts.

Figure 1:
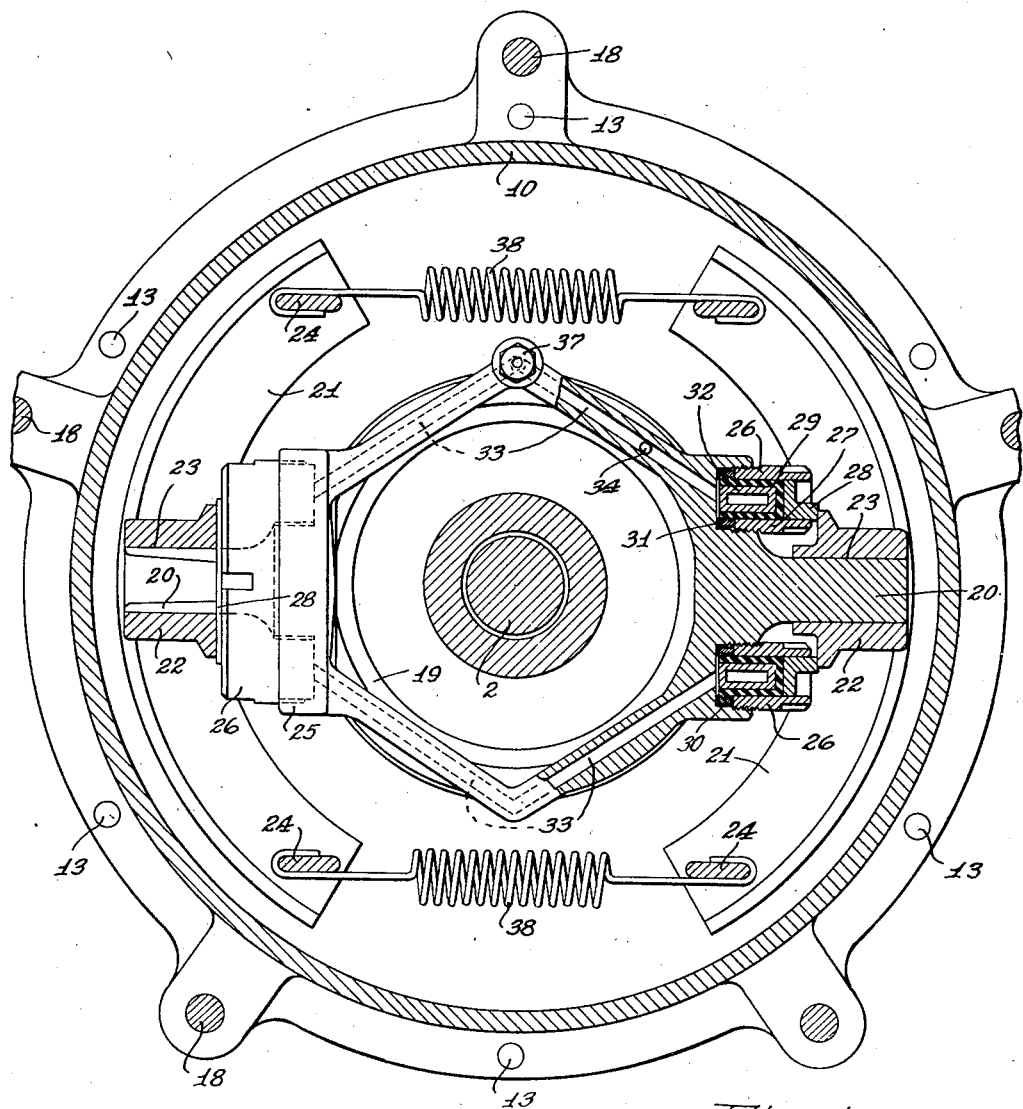

The numeral 1 designates a flange which is adapted to be secured to a stationary part such as the steering knuckle of a front axle assembly (as taught, for instance, in Patent No. 1,982,698, granted December 4, 1934, on an earlier invention by me) or the axle housing of a rear axle assembly. The flange 1 as here illustrated is particularly adapted to be secured to the end of a live axle housing (not shown) containing a live axle 2. The outer end of the live axle is tapered as at 3 and supports the outer section 4 to a hub structure. The outer section or disk 4 is secured upon the tapered end 3 of the live axle 2 by a nut 5 in such manner that it rotates with the axle. The section or disk 4 has an inwardly directed annular formation 6 coaxial therewith supported upon anti-friction bearings 7 carried by an axial tubular extension 8 on the flange 1. The outer section or disk 4 is therefore mounted to rotate with the shaft 2 upon the stationary flange 1 and inasmuch as the flange 1 is supported by the rear axle housing the load or weight of the vehicle is transferred from the housing through the flange 1 to the outer wheel section or disk 4.

The hub section or disk 4 has an inclined wall 9 extending annularly providing a braking surface and outwardly of the wall 9 is an annular formation 10. A hub section or disk 11 is provided with an inclined wall 12 forming a braking surface and is secured at its periphery by bolts 13 to the annular formation 10 on the section or disk 4. Dust sealing means 14 is provided to seal the space between the wall of the axial opening 15 in the hub section 11 and the flange 1. A tire supporting rim 16, preferably of the drop center type, is attached to a disk 17 as by welding and the disk 17 is secured to the periphery of the hub section 4 by the bolts and nuts indicated at 18. Hub sections 4 and 11 thus constitute the opposing side walls of a braking chamber unit of which the walls 9 and 12 form braking surfaces, with the rim secured to such unit.

Secured by bolts to the flange 1 is a spider 19 having two diametrically opposed radially extending guide arms 20. Brake shoe units, such as shown in Figs. 7 and 8, comprising two sectional type conical portions 21 are supported by the arms 20 for radial movement with respect to the spider. The braking portions 21 of the shoe formations are united centrally of the ends by a cross structure 22 having a squared opening 23 therein. The shoe portions 21 are also united adjacent their ends by rigid cross members 24. The opening 23 and the arms 20 are so proportioned relatively that they permit a slight amount of lateral movement of the brake shoe units with respect to the arms 20, or in other words movement of the brake shoe units to the right or to the left as they are shown in Fig. 2. The conical brake shoe units may move, therefore, in such manner that they adapt themselves to the oppositely inclined braking surfaces of the hub structure so that when they are applied against such braking surfaces by mechanism to be hereinafter described the contact therebetween will be uniform throughout the length thereof.

Figure 4:
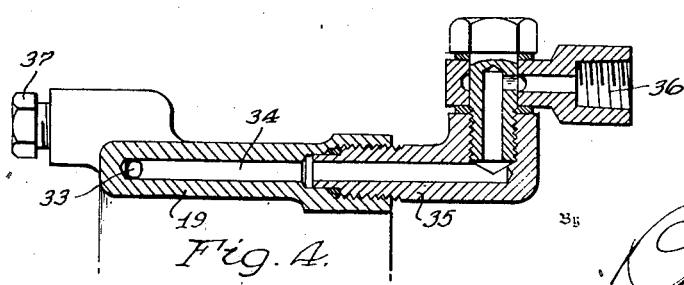
Fig. 4 is a section of a detail.
Figure 3:
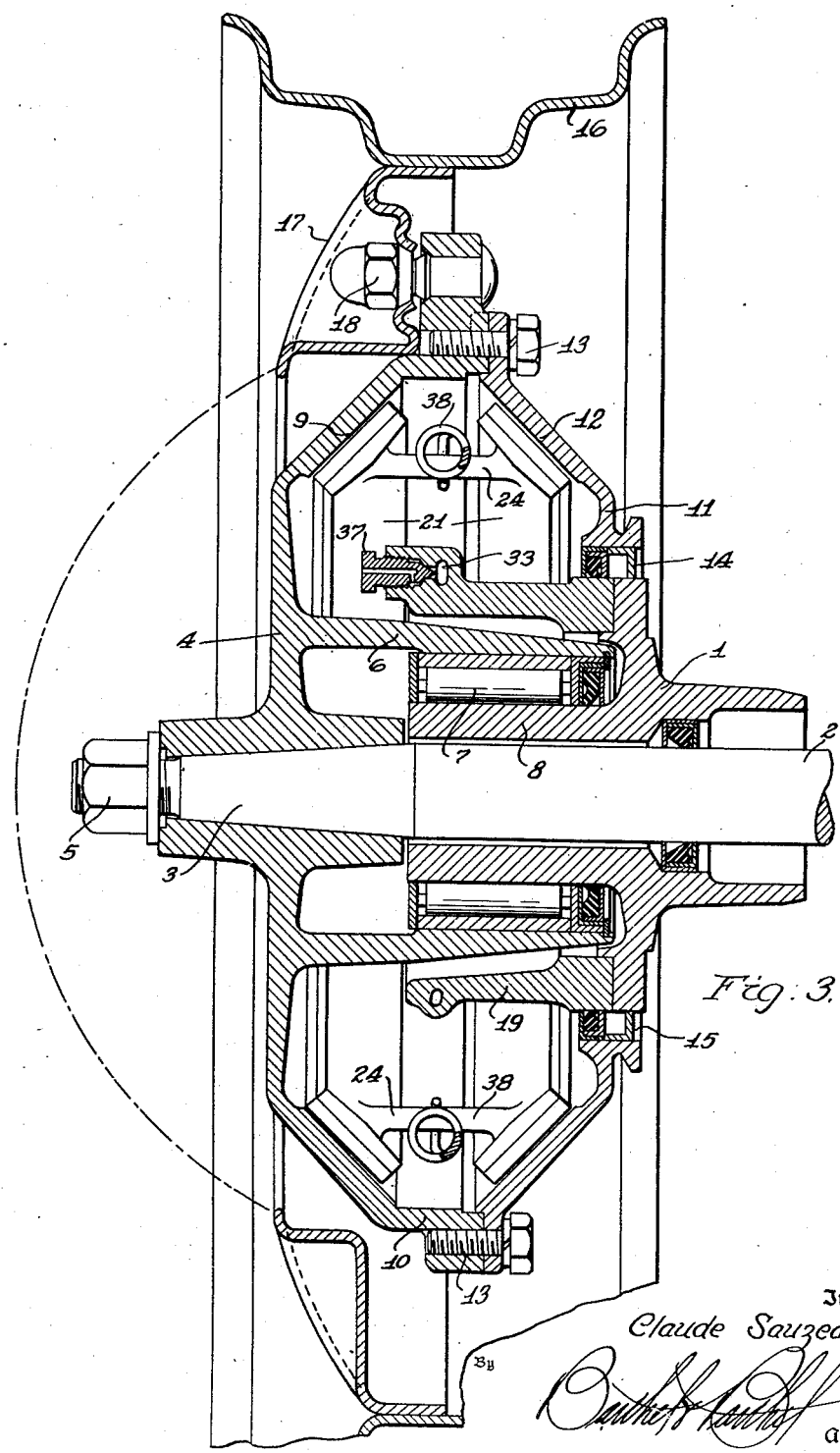
Fig. 3 is a vertical section taken at right angles to Fig. 1.

Surrounding each radial arm 20 and coaxial therewith is an annular formation 25 having a screwthreaded zone receiving the screwthreaded end of a cylindrical body 26. A similar cylindrical body 27 is screwthreaded on to the base of the arm 20. The two bodies 26 and 27 thus form side walls of a pressure chamber annular with respect to the arm 20 and in which is slidably received an annular movable element or piston 28. The outer end of the piston 28 contacts with the adjacent central cross member 22 on the brake shoe unit. An elastic seal 29 of annular configuration and of U-shape cross section has an annular metal reinforce 30 surface bonded to one end thereof and clamped between the cylindrical body 27 and the bottom of the annular formation 25. Within the pressure chamber thus formed and enclosed by the elastic seal 29 is a hollow filler element 32 preferably filled with a liquid which will tend to maintain it in a cool condition. Two pressure chambers (one for each brake unit) are thus provided and they are connected by fluid conduits or passages 33 in the spider. As shown more clearly in Fig. 4 fluid under pressure from an external source is supplied to the passages 33 and the pressure chambers connected therewith through the passage 34 having a fitting 35 secured to the outer end thereof and having means such as that shown at 36 for connecting the same to a fluid conveying pipe line. Communicating with the passages 33 at their highest point is a bleeder valve 37 through which air may be exhausted from the passages and pressure chambers in order that they may be completely filled with liquid.

Two brake shoe units are supported diametrically opposite as is better shown in Fig. 1 and in order to retract the shoes tension springs 38 are connected to the cross members 24 on the brake shoe units. These springs 38 tend to draw the shoe units inwardly and maintain engagement between the central cross members 22 and respective pistons 28. When fluid under pressure is supplied to the expansion chambers by means of hydrostatic brake actuators well known in the art the filler elements 32 are moved outwardly and cause the elastic seals 29 to stretch and to press against the pistons 28 to force the shoe units into engagement with the braking surfaces in the hub sections. Although the brake shoe units are held in engagement with the ends of their respective pistons there is no positive connection therebetween.

From a production standpoint the above described brake unit has the advantage that it may be quickly and easily assembled. For example upon reference to Fig. 6 it may be seen that the spider formation and the expansion mechanism may be completely assembled as a single unit and secured to an axle flange. In order to assemble the shoes all that is necessary is to slip them over the radial arms 20. The construction also lends itself equally to servicing inasmuch as the entire pressure unit may be removed as a unit or the brake shoe unit may be separately removed with the result that they may be readily replaced.

In order to provide a brake unit wherein no adjustments are required from the time the brake is initially assembled until the brake linings are completely worn out it is necessary to construct the elastic seal so that it may stretch considerably without damage. This stretching is accommodated by making the seal comparatively long in the direction it stretches. Ordinarily, such lengthening of the seal would result in enlargement of the space which must be occupied by liquid and would thereby cause a large volume of liquid to be subject to heat conditions, with the result that the degree of expansion and contraction of the liquid would be great. The filler element 32 occupies the space created by lengthening the seal with the result that only a small amount of liquid is present in the expansion chambers when the brake units are inoperative, the actual amount being a comparatively thin film.

As is illustrated in Fig. 9 by way of modification, it is not necessary to successful operation of the brake unit that the filler element be made as a separate element. It may be provided by an integral annular formation 32a within the annular formation 25a and surrounding the radial arm 20a.

Although a specific embodiment of the invention has been illustrated and described it will be understood that various changes may be made within the scope of the appended claims without departing from the spirit of the invention and such changes are contemplated.

What I claim is:

1. In a hydrostatic brake, a rotatable brake drum, a stationary spider, guide arms on said spider and extending radially with respect thereto, a brake-shoe unit individual to each guide arm and each supported by its arm to move relative to the arm in the direction of the arm axis, an annular pressure chamber surrounding each guide arm, a piston in each chamber and engaging the brake shoe unit operated thereby, and means for conveying fluid under pressure to said chamber.

2. In a hydrostatic brake, a rotatable brake drum, a stationary spider, diametrically opposed radially extending guide arms on said spider, brake shoes slidably supported on said guide arms for movement radially with respect to said drum, an annular pressure chamber surrounding each guide arm, a piston in each chamber and engaging respective shoes, and means for conveying fluid under pressure to said chambers.

3. In a hydrostatic brake, a rotatable brake drum, a stationary spider, guide arms on said spider and extending radially with respect thereto, brake shoes slidably supported on said arms, an annular movable element surrounding each guide arm and engaging respective shoes, and fluid pressure means for moving said annular movable element to apply said shoes against said drum.

4. In a hydrostatic brake, a rotatable brake drum, a stationary body having rigid radial arms thereon, brake shoes supported by said arms for movement radially of said drum, said stationary body having an annular fluid pressure expanding means surrounding each arm and engaging respective brake shoes, resilient means normally moving said shoes inwardly and compressing said fluid pressure means, and means for conveying fluid under pressure to said expansive means.

5. In a hydrostatic brake, a rotatable brake drum, a stationary spider, guide arms on said spider and extending radially with respect thereto, an annular pressure chamber surrounding each guide arm, a piston in each chamber and engaging respective shoes, means for conveying fluid under pressure to said chamber, and a filler element in each chamber for occupying space therein to reduce the fluid contents thereof when the piston therein is retracted.

6. In a hydrostatic brake, a rotatable brake drum, a stationary body having rigid radial arms thereon, brake shoes supported by said arms for movement radially of said drum, said stationary body having an annular fluid pressure expanding means surrounding each arm and engaging respective brake shoes, resilient means normally moving said shoes inwardly and compressing said fluid pressure means, means for conveying fluid under pressure to said expansive means, and a filler element in each expansion means for occupying space therein to reduce the fluid contents thereof when the same is compressed.

7. In a hydrostatic brake, a rotatable drum having complemental brake surfaces, a stationary spider, said spider having radially extending arms disposed with their axes in a plane substantially intermediate the complemental brake surfaces, brake shoes slidably mounted on said arms, an annular expansion chamber surrounding each arm and having a fluid pressure movable element engaging respective pistons, and means for conveying fluid under pressure to said expansion chamber.

8. In a hydrostatic brake, a rotatable brake drum, having complemental brake surfaces, a stationary spider, said spider having radially extending arms disposed with their axes in a plane substantially intermediate the complemental brake surfaces, brake shoes slidably mounted on said arms, each shoe having a plurality of braking surfaces adapted for engagement with the complemental brake surfaces of said drum, said shoes being shiftable laterally with respect to said arms to permit uniform engagement of the shoe surface with the drum surface, an annular expansion chamber surrounding each arm and having a fluid pressure movable element engaging respective pistons, and means for conveying fluid under pressure to said expansion chamber.

9. In a hydrostatic brake, a rotatable drum, a stationary spider, said spider having a plurality of annular formations providing pressure chambers, said pressure chambers being disposed with their axes extending radially, said spider having a rigid arm extending radially through each expansion chamber, brake shoes slidably mounted on said arms and adapted to move radially thereof for engagement with said drum, and a movable element in each expansion chamber movable in response to fluid pressure and adapted to engage respective shoes to move them into engagement with said drum, and means for conveying fluid to said expansion chamber.

10. In hydrostatic braking systems, wherein fluid-pressure actuated brake mechanism is mounted within a chamber opposite side walls of which are rotatable and carry braking surfaces, and wherein the complemental brake faces are movable radially relative to the axis of rotation into and out of engagement with the braking surfaces, such system including a stationary spider carrying an arm extending radial relative to such axis of rotation, a formation carried by said spider annular with respect to the axis of the arm and extending around said arm with the formation constituting an expansion chamber adapted to expand in the direction of the length of such arm under fluid pressure, said formation including an annular element movable by such chamber expansion in the direction of such expansion, and a brake shoe unit slidably supported by and movable on said arm, said unit being engaged by said annular element to move therewith, whereby the brake unit will be moved radially into and out of engagement with the braking surfaces.

11. A system as in claim 10, characterized by a rigid annular filler element within said expansion chamber operative to limit the fluid content space of said chamber.

12. A system as in claim 10 characterized in that the brake unit is formed with an opening for the spider arm with the arm and walls of the opening non-circular in contour within the zone of overlying relationship, and with the relative dimensions of arm and opening sufficiently varied on a cross-section of the arm within the zone as to permit limited play therebetween, whereby the brake unit is held against material rotation about the arm but is permitted movement relative to the arm to enable proper seating of the unit relative to the braking surfaces with which the unit is adapted to co-operate.

13. A system as in claim 10 characterized in that the brake unit is formed with a pair of brake surfaces spaced apart in parallelism with each face extending arcuate in one direction and inclined to the direction of length of the arm on a section of the unit at right angles to the arcuate length and with the inclination of one face opposite that of the other to thereby conform to segments of the configuration of the braking surfaces of the opposite side walls of the chamber, the unit having a non-circular opening intermediate the faces for the reception of the spider arm.

14. A system as in claim 10 characterized in that the contact between the formation element and the brake unit is concentric relative to the length axis of the arm a distance sufficient to locate the contact zone as underlying an intermediate portion of the width of a brake face of the unit on a cross-section of the unit extending through the length axis of the arm and at right angles to the direction of length of the brake face, whereby the pressure-developed movements of the element will be applied to the unit remote from the axis of unit movement in the direction of its brake-set position.

CLAUDE SAUZEDDE.